United States Patent
Gramlich et al.

(10) Patent No.: US 12,287,041 B1
(45) Date of Patent: Apr. 29, 2025

(54) SLAB GATE VALVES AND METHODS OF RETROFITTING

(71) Applicant: Bestway Oilfield, Inc., Channelview, TX (US)

(72) Inventors: Don Channing Gramlich, Richmond, TX (US); Mehul Jain, Humble, TX (US)

(73) Assignee: Bestway Oilfield, Inc., Channelview, TX (US)

( * ) Notice: Subject to any disclaimer, the term of this patent is extended or adjusted under 35 U.S.C. 154(b) by 0 days.

(21) Appl. No.: 18/918,208

(22) Filed: Oct. 17, 2024

Related U.S. Application Data

(60) Provisional application No. 63/544,776, filed on Oct. 18, 2023.

(51) Int. Cl.
| | |
|---|---|
| *F16K 3/314* | (2006.01) |
| *F16K 3/02* | (2006.01) |
| *F16K 3/36* | (2006.01) |

(52) U.S. Cl.
CPC ............ *F16K 3/314* (2013.01); *F16K 3/0227* (2013.01); *F16K 3/36* (2013.01)

(58) Field of Classification Search
CPC ........... F16K 3/314; F16K 3/0227; F16K 3/36
USPC ........ 251/193, 195–202, 355, 326–329, 174, 251/214
See application file for complete search history.

(56) References Cited

U.S. PATENT DOCUMENTS

| | | | | |
|---|---|---|---|---|
| 2,063,655 A | * | 12/1936 | Barner | F16K 3/36 |
| | | | | 251/266 |
| 2,977,975 A | * | 4/1961 | Allen | F16K 29/02 |
| | | | | 251/312 |
| 3,095,004 A | * | 6/1963 | Jackson, Jr. | F16K 3/36 |
| | | | | 137/246.11 |
| 3,347,261 A | * | 10/1967 | Yancey | F16K 3/207 |
| | | | | 137/246.22 |
| 3,412,748 A | * | 11/1968 | Volpin | F16K 3/36 |
| | | | | 137/239 |
| 3,696,831 A | * | 10/1972 | Fowler | F16K 3/36 |
| | | | | 251/327 |
| 3,768,774 A | * | 10/1973 | Baugh | F16K 27/044 |
| | | | | 251/327 |
| 4,245,661 A | * | 1/1981 | McGee | F16K 3/36 |
| | | | | 137/72 |
| 4,281,819 A | * | 8/1981 | Linder | F16K 39/04 |
| | | | | 251/282 |
| 10,060,548 B1 | * | 8/2018 | Oak | F16K 31/508 |
| 10,233,721 B2 | * | 3/2019 | Hoang | F16K 25/04 |

(Continued)

*Primary Examiner* — John Bastianelli
(74) *Attorney, Agent, or Firm* — Johnston IP Law, PLLC

(57) ABSTRACT

In one instance, a dynamic slab gate valve includes a valve body having a through-bore formed therethrough; a round gate cavity formed within the valve body and orthogonal to and bisecting the though-bore; and at least two retrofit slabs located within the round gate cavity. The retrofit slabs form a slab gate cavity having two parallel planar sides. A slab gate is disposed within the slab gate cavity. In another instance, a method for retrofitting a round gate valve includes the steps of removing a round gate from a round gate cavity of the round gate valve; installing a plurality of retrofit slabs within the round gate cavity to form a slab gate cavity; and installing a slab gate within the slab gate cavity. Other instances include seat assemblies and dynamic skirt assemblies.

12 Claims, 13 Drawing Sheets

(56) References Cited

U.S. PATENT DOCUMENTS

2020/0240537 A1\* 7/2020 Moseley .................... F16K 3/30
2021/0215255 A1\* 7/2021 Kalimuthu ............ F16K 27/044

\* cited by examiner

US 12,287,041 B1

SLAB GATE VALVES AND METHODS OF RETROFITTING

RELATED APPLICATION

This application claims the benefit of U.S. Provisional Patent Application 63/544,776 filed on Oct. 18, 2023, which is incorporated herein by reference for all purposes.

TECHNICAL FIELD

This application is directed, in general, to valves for use in fluid transfer applications, and more specifically to gate valves with rectangular slabs and methods of and components for retrofitting round-cavity gate valves to have rectangular slots and dynamic assemblies.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

Gate valves are used to control the transfer of fluids in tubing and pipelines. Specifically, gate valves are used to stop and start the flow of fluids in tubing or pipelines. Gate valves are commonly used in the oil and gas industry to control the flow of various fluids such as production fluids, water, fracking fluids, and other fluids used in drilling, operating, and maintaining oil and gas wells.

Gate valves generally operate by actuation of an internal gate, which in a first position has an opening to allow upstream fluids to flow through the valve and in a downstream direction and a second position which blocks flow through the valve thereby preventing transfer of fluid in a downstream direction. In some circumstances, a gate valve may be used over a range of positions as a throttling valve. While gate valves have been in existence for a long time, improvements are still desired.

SUMMARY

In one illustrative embodiment a retrofitted valve includes a valve body having a through-bore formed therethrough, a round gate cavity formed within the valve body and orthogonal to and bisecting the though-bore; at least two retrofit slabs located within the round gate cavity; and a slab gate slidably disposed within the slab gate cavity. A first side of each retrofit slab is curved to conform to a curved wall of the round gate cavity and a second side of each retrofit slab is substantially planar. The retrofit slabs form a slab gate cavity having two parallel planar sides for receiving a slab gate. The slab gate, when in a first position, allows for fluid flow through the through-bore and, when in a second position, substantially blocks fluid flow through the through-bore.

In one illustrative embodiment, a method of retrofitting a round gate valve includes the steps of removing a round gate cavity gate from a round gate cavity of the round gate cavity valve; installing a plurality of retrofit slabs within the round gate cavity to form a semi rectangular gate cavity within at least a portion of the round gate cavity; installing two dynamic seats that are partially disposed within the round gate cavity and partially disposed within a through-bore of the round gate valve; and installing a slab gate within the semi rectangular gate cavity. The semi rectangular gate cavity is formed by a planar side of each of the retrofit slabs.

In one illustrative embodiment, a dynamic slab gate valve includes a valve body having a through-bore therethrough; a round gate cavity formed within the valve body and orthogonal to and bisecting the though-bore; at least two retrofit slabs located within the round gate cavity; at least two seats installed proximate to an intersection of the round gate cavity and the through-bore; a slab gate slidably disposed within the slab gate cavity; at least one stem connected to the slab gate; and a dynamic skirt assembly disposed between each retrofit slab and the slab gate. The round gate cavity has a circular cross section. A first side of each retrofit slab is curved to conform to a curved wall of the round gate cavity, and a second side of each retrofit slab is substantially planar. The retrofit slabs form a slab gate cavity having two parallel planar sides for receiving a slab gate.

DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
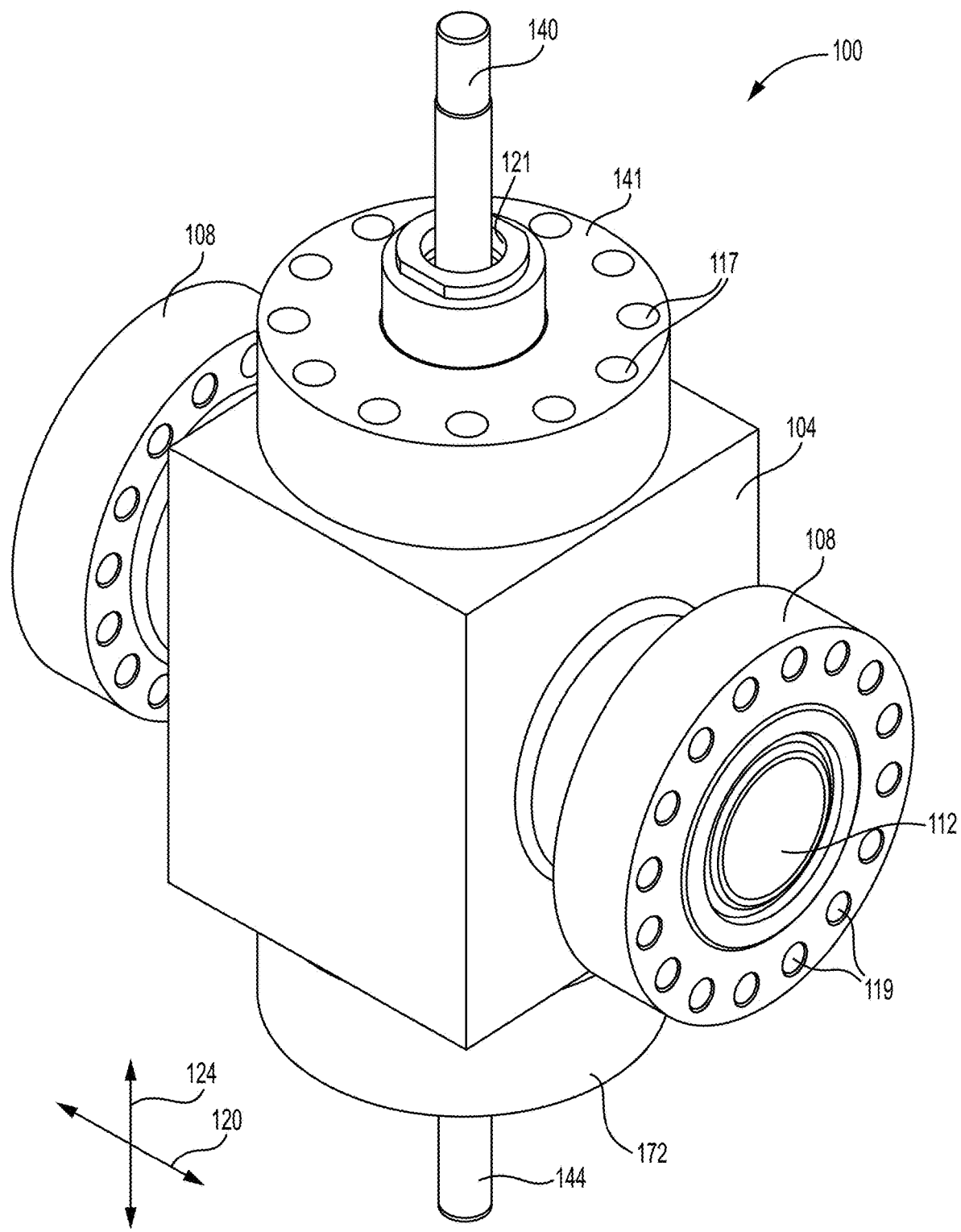
FIG. 1 is a schematic, perspective view of an illustrative embodiment of a retrofitted gate valve with dynamic assemblies.

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized, and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense, and the scope of the present invention is defined only by the claims. Unless otherwise indicated, as used throughout this document, "or" does not require mutual exclusivity.

In one embodiment, a round cavity gate valve is retrofitted with one or more retrofit slabs to convert at least a portion of the round gate cavity into a rectangular shape for acceptance of a slab gate. A first side of the retrofit slab is shaped and sized to conform to the rounded edges of the gate cavity. A second side of the retrofit slab is shaped and sized to form a substantially flat surface for contact with a surface of a slab gate. In other embodiments, the second side of the retrofit slab is configured to receive a skirt assembly, which is disposed between the retrofit slab and the slab gate, so that one side of the skirt assembly contacts and engages with the slab gate, at least when the slab gate is in the closed position. In addition, a skirt energizer is located between the retrofit slab and a skirt plate for biasing the skirt plate toward the slab gate.

In one embodiment, a method for retrofitting a round gate cavity valve gate to a slab gate includes the steps of: disassembling an existing round cavity gate valve to remove a round gate cavity gate; inserting a first retrofit slab and a second retrofit slab into the round gate cavity so that the sides of the retrofit slabs that are facing away from a center bore of the round gate cavity are in contact with and conform to the curved walls of the round gate cavity and the sides of the retrofit slabs that are facing the center bore of the round gate cavity are configured to receive a dynamic skirt assembly; inserting at least two seat assemblies, which when installed are partially disposed within a though-bore of the valve and partially disposed within the round gate cavity; inserting into the round gate cavity a first and second dynamic skirt assembly so that a first side of each dynamic skirt assembly is received by the second side of each retrofit slab and a skirt energizer is located between a skirt plate of the skirt assembly and the adjacent retrofit slab; and inserting a slab gate, at least a portion of which has a substantially rectangular cross section, into the round gate cavity so that, when the slab gate is in a closed position, the slab gate, first dynamic skirt assembly, second skirt assembly, first retrofit slab, and second retrofit slab work together to seal the gate valve and to prevent fluid or gas flow along a through-bore of the gate valve. As used herein, a round gate cavity gate is one that is intended to be used in a round gate cavity having a circular cross sectional area or not having a cross sectional area having any straight line edges.

Referring now primarily to FIG. 1, an illustrative embodiment of a retrofitted valve 100 is depicted. The retrofitted valve 100 has a valve body 104, flanges 108, and a through-bore 112. The flanges 108 are sized and configured to mate the retrofitted valve 100 with upstream and downstream pipes or tubulars. Upstream and downstream pipes or tubulars are fastened to the valve body 104 using bolt holes 119 with bolts or studs. The through-bore 112 runs through the valve body 104 in a first direction 120 to provide a flow path for liquids or gasses flowing through the retrofitted valve 100. The retrofitted valve includes an upper bonnet 141 and lower bonnet 172 mounted to the valve body 104. The upper bonnet 141 is coupled to the valve body 104 using bolt holes 117 with bolts or studs. The lower bonnet 172 is coupled to the valve body 104 using bolt holes 115 (FIG. 4) with bolts or studs. An upper gate stem 140 protrudes through an upper stem aperture 121. The portion of the upper stem 140 that protrudes through the upper stem aperture 121 may be coupled to an operator for controlling the status (i.e. open, partially open, closed) of the retrofitted gate 100.

Figure 2:
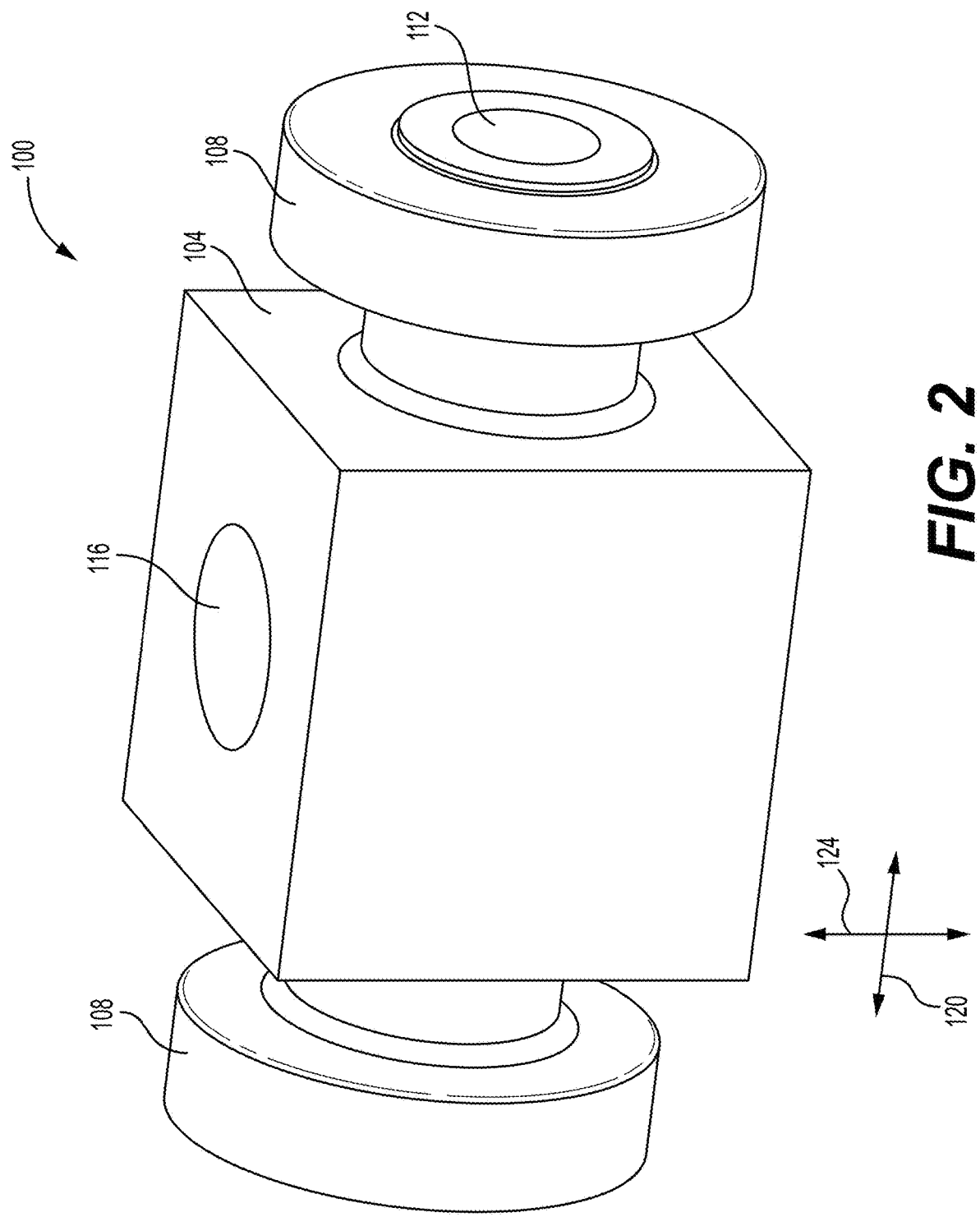
FIG. 2 is a schematic, perspective view of an illustrative embodiment of a body of a retrofitted gate valve with dynamic assemblies.
Figure 3:
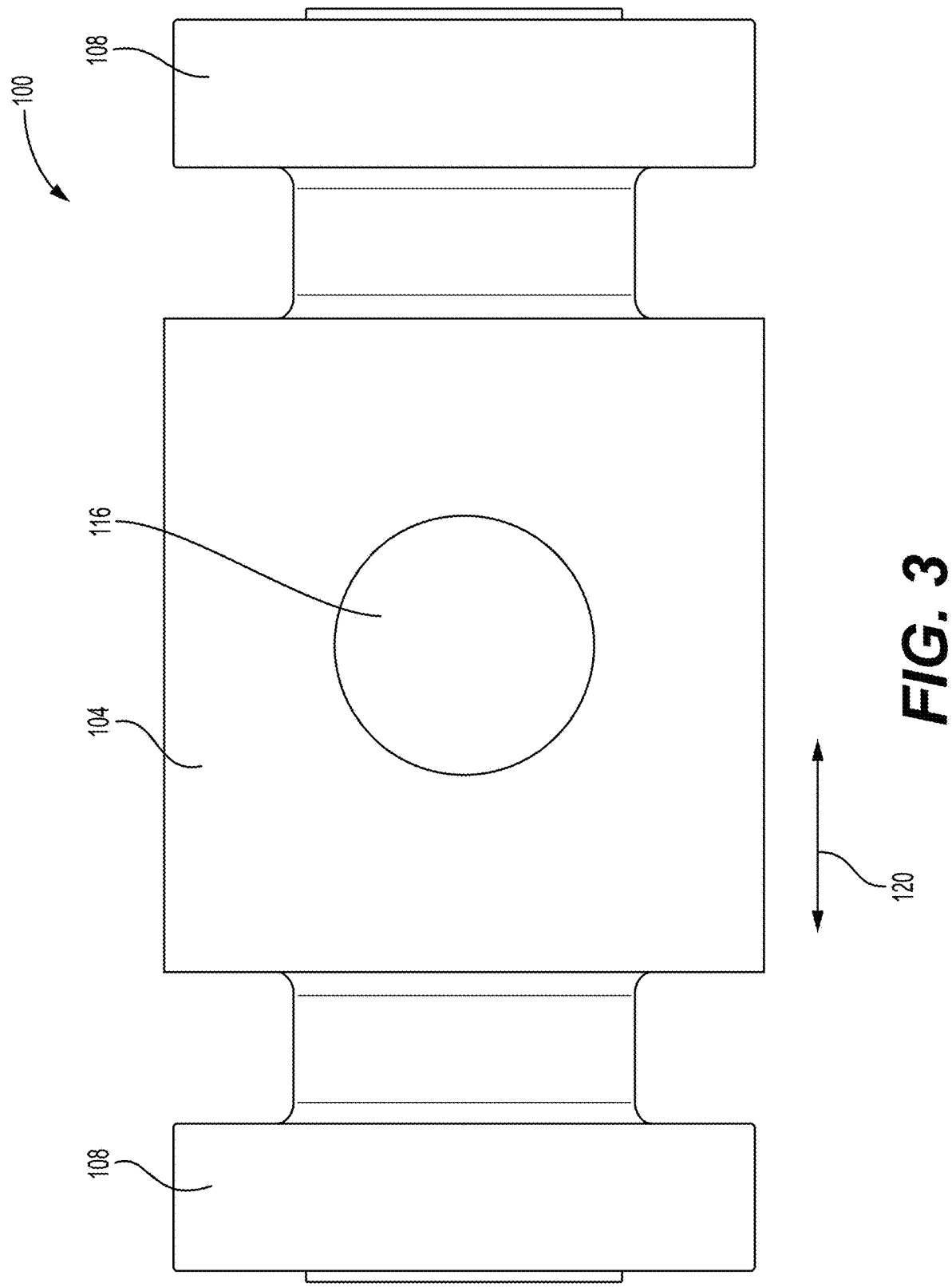
FIG. 3 is a schematic, plan view of an illustrative embodiment of a body of a retrofitted gate valve.

Now referring primarily to FIGS. 2 and 3, a round gate cavity 116 is formed within the body 104 of the retrofitted gate valve 100. FIGS. 2 and 3 depict the retrofitted gate valve prior to being retrofitted. The round gate cavity 116 is a bore running through the valve body 104 in a second direction 124 that bisects the through-bore 112 at around 90 degrees. Therefore, the round gate cavity 116 and the through bore 112 are substantially orthogonal to each other. As can be seen in FIG. 3, which is an overhead view of the retrofit valve, the round gate cavity 116 has a circular cross sectional shape.

Figure 4:
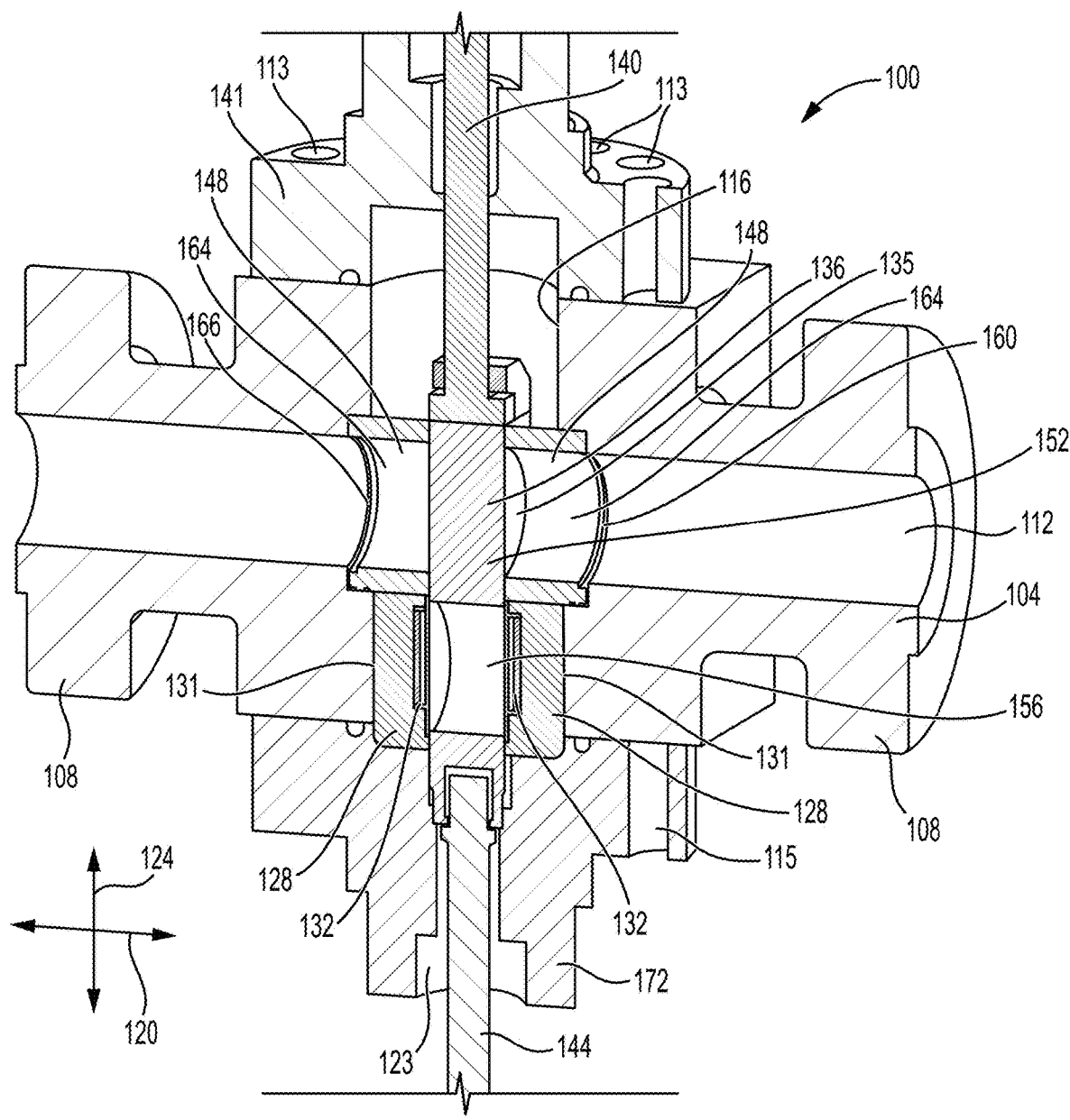
FIG. 4 is a schematic, perspective view with a portion in cross section of an illustrative embodiment of a retrofitted gate valve in a closed position.
Figure 5:
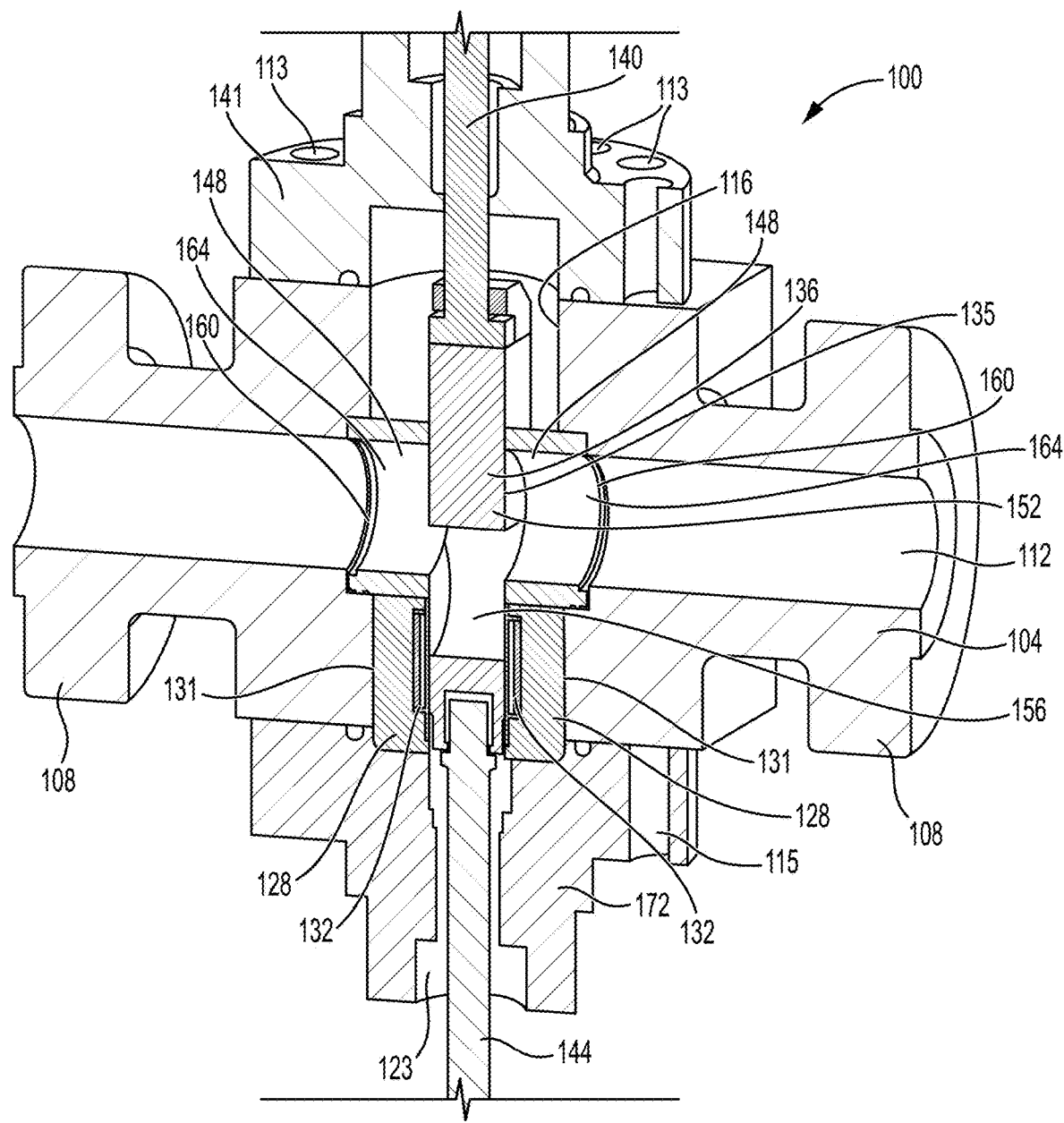
FIG. 5 is a schematic, perspective view with a portion in cross section of an illustrative embodiment of a retrofitted gate valve in a half open position.
Figure 6:
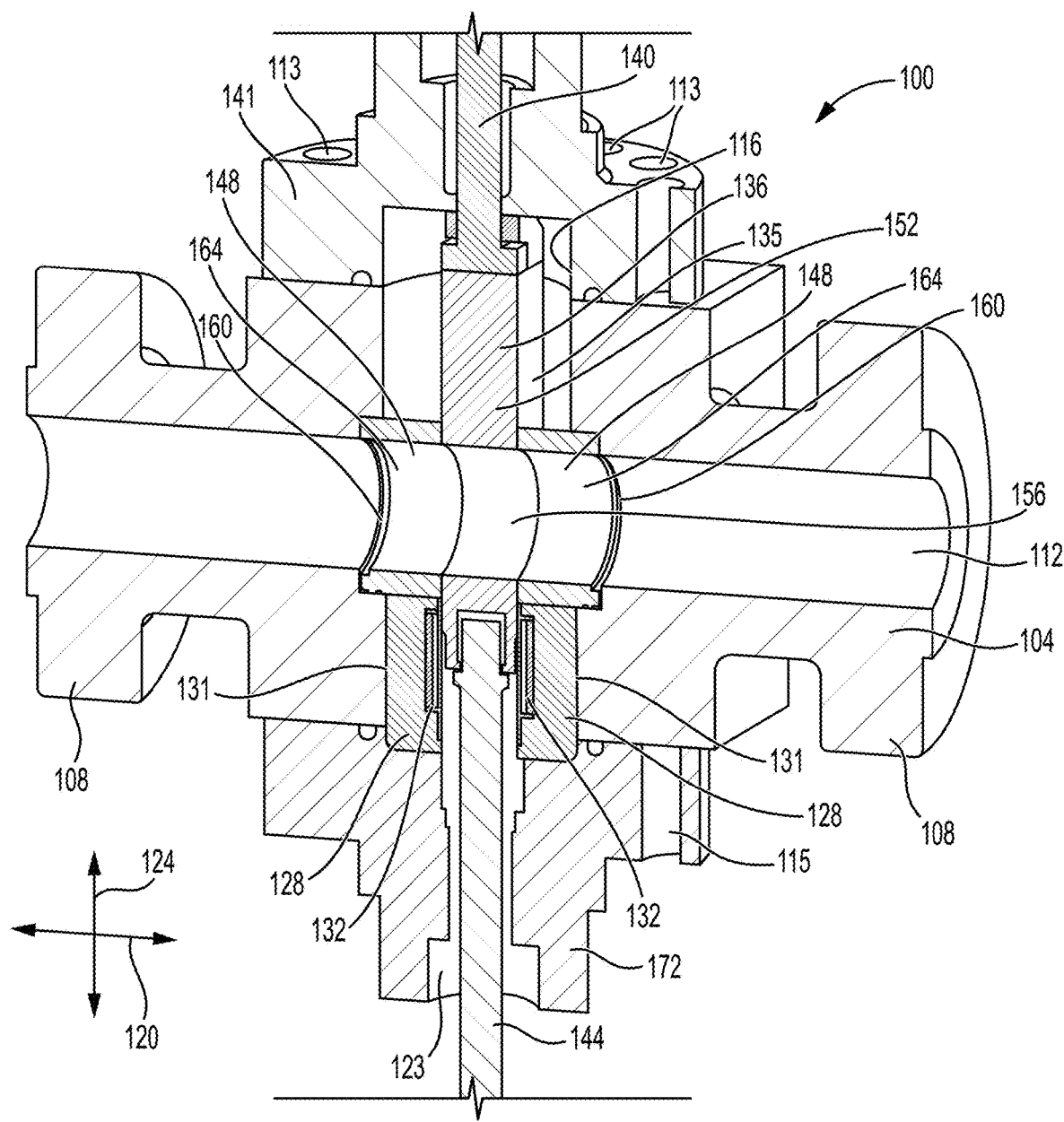
FIG. 6 is a schematic, perspective view with a portion in cross section of an illustrative embodiment of a retrofitted gate valve in an open position.

Referring now primarily to FIGS. 4-6, an assembled embodiment of a retrofitted valve 100 is depicted. FIGS. 4-6 depict the retrofitted gate valve 100 after retrofitting. FIG. 4 depicts the retrofitted valve 100 in a closed position. FIG. 5 depicts the retrofitted valve 100 in a half open position. FIG. 6 depicts the retrofitted valve 100 in an open position. Disposed within the round gate cavity 116 are retrofit slabs 128, dynamic skirt assemblies 132; a slab gate 136; the upper stem 140; and a lower stem 144. The lower stem 144 protrudes out of the round gate cavity 116 and the valve body 104 through a lower stem aperture 123.

A plurality of seat assemblies 164 are also partially disposed within the round gate cavity 116. In some embodiments, the upper or lower stems 140, 144 are connected to the slab gate 136 with a tee and t-slot connection that allows for movement of the slab gate in the first direction 120 relative to the upper stem or the lower stem.

The slab gate 136 is configured with two flat sides 135, each of which faces the through-bore 112 on either side of the slab gate 136. The slab gate 136 has a solid area 152 and an open area 156 defined by a flow aperture. The slab gate 136 is configured to move in the second direction 124 between a closed position (FIG. 4) and an open position (FIG. 6). When in the closed position, the solid area 152 of the slab gate 136 is in line with and blocks the through-bore 112. When in the open position, the flow aperture of the open area 156 is in line with the through-bore 112 to allow fluid to flow through the through-bore 112.

The seat assemblies 164 are partially disposed within the round gate cavity 116 and the seat pockets 160. The seat pockets 160 are cavities that are coincident to the through-bore 112 located at the intersection of the through-bore 112 and the round gate cavity 116. The seat cavities are shaped to accept the seat assemblies 164. The seat assemblies 164 include a seat 148 and seals, o-rings, or debris rings attached to the seat 148. In some instances, the seat assembly 164 is a dynamic seat assembly that includes a seat energizer, such as a spring, for urging the seat 148 or the seat assembly 164 toward the slab gate 136. In some embodiments, the seat energizer is located between the seat 148 and a wall of the valve body 104 in the seat pocket 160.

When installed within the retrofitted valve 100, the slab gate 136 and the seat assemblies 164 function to seal a portion of the retrofitted valve 100, when in the closed position, through a surface-to-surface contact between each side 135 of the slab gate 136 and a side of the adjacent seat 148 of each seat assembly 164. The sealing sides 135 of the slab gate 136, which are the sides 135 that contact the seats 148, and the corresponding sealing surface of the seats 148, are both planar surfaces to increase surface to surface contact between these components to increase the quality of the seal between these components.

The retrofit slabs 128 are disposed within the round gate cavity 116 and convert the rounded walls of the round gate cavity 116 into a planar surface to compliment the sealing sides 135 of the slab gate 136. A first side 176 (see FIGS. 9 and 10) of each retrofit slab 128 is a curved surface. This first side 176 conforms with the curved walls of the round gate cavity 116 and, when installed, the retrofits slabs 128 fill gaps that would otherwise exists between the slab gate 136 and the walls of the round gate cavity 116. Each retrofit slab 128 is disposed into a retrofit cavity 131, which is formed between the lower bonnet 172 and the seat assembly 164.

Figure 7:
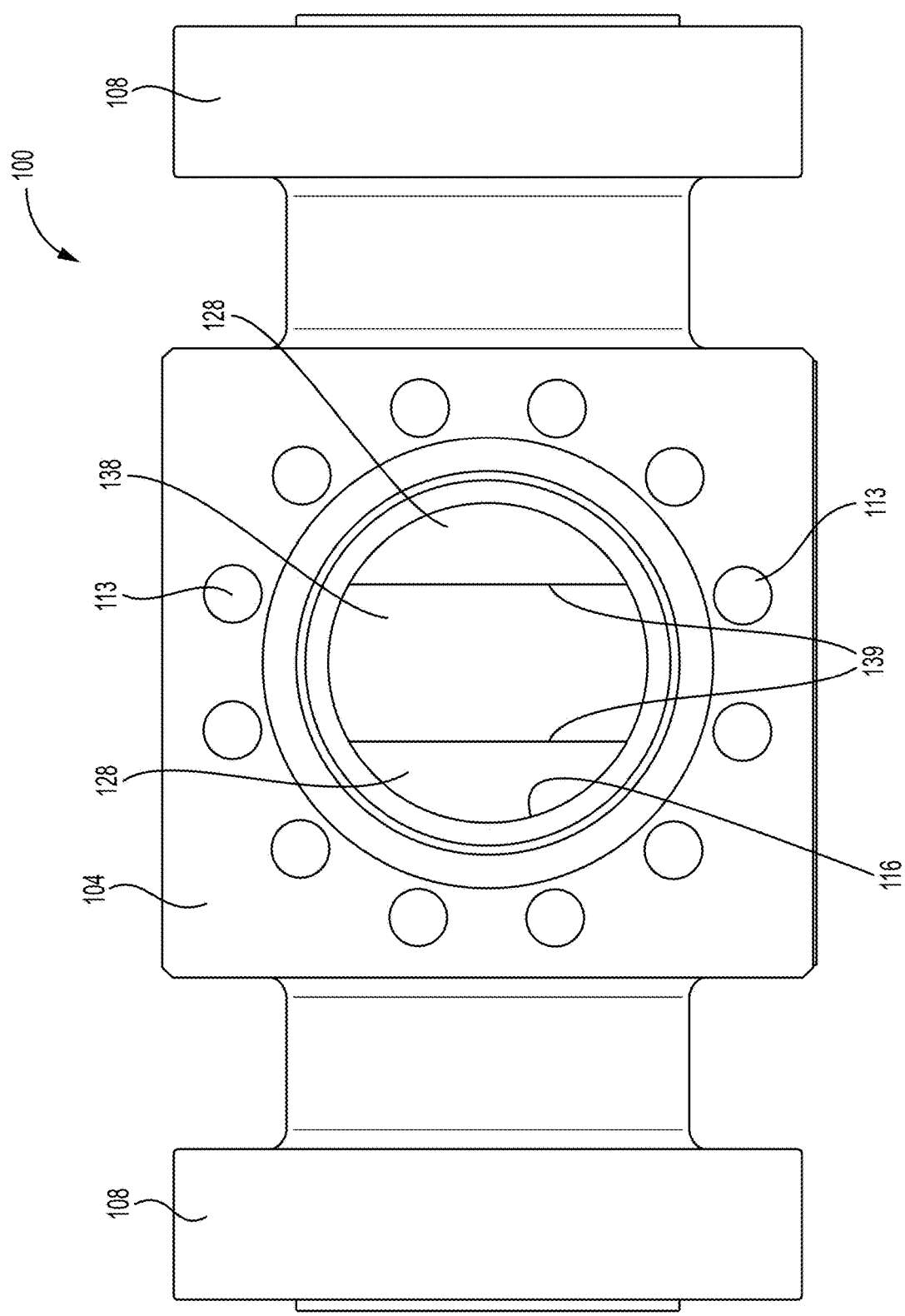
FIG. 7 is a schematic, plan view of an illustrative embodiment of a retrofitted gate valve.

FIG. 7 depicts a plan view of an embodiment of a retrofitted valve 100 with the upper bonnet 141 removed. The round gate cavity 116 is visible in FIG. 7. Without retrofit slabs 128, the round gate cavity 116 would be expected to receive a gate designed to fit within a round gate cavity to conform with the shape of the round gate cavity 116. In the retrofitted valve 100, the retrofit slabs 128 change the inner shape of at least a portion of the round gate cavity 128 from circular cross section to substantially rectangular cross section. As can be seen in FIG. 7, the retrofit slabs 128 create a slab gate cavity 138 with at least two planar sides 139 for receiving a slab gate 136. The slab gate cavity 138 may therefore be an area within the round gate cavity 116 having a rectangular cross sectional shape with two sides of the rectangular cross section defined by the planar sides 139 of the retrofit slabs 128. The slab gate 136 is sized and configured to be slidably received within the slab gate cavity 138 and has at least a portion that has a rectangular cross sectional shape to interface with the planar sides 139 of the retrofit slabs 128.

Figure 8:
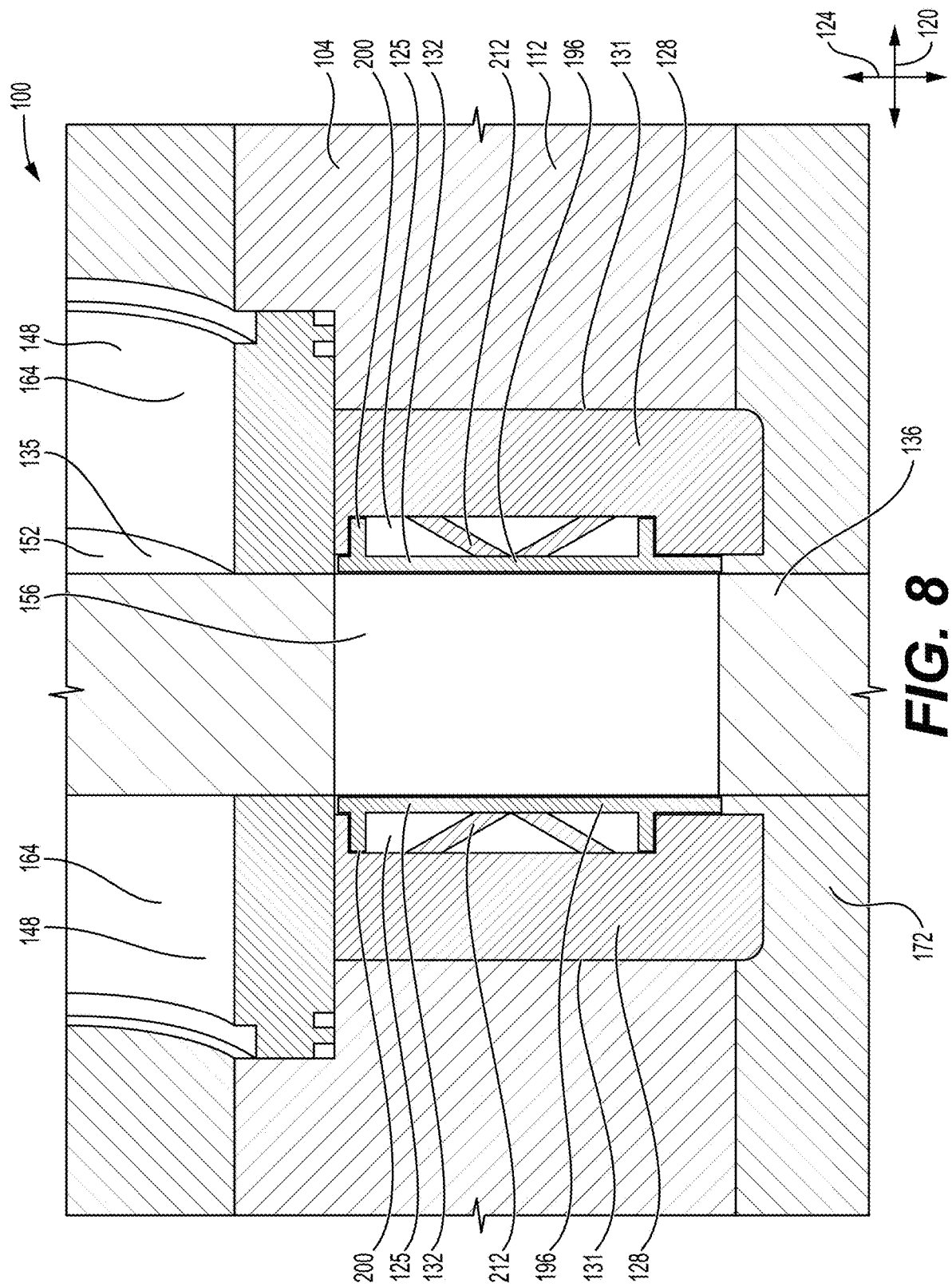
FIG. 8 is a schematic, perspective detailed view with a portion in cross section of a portion of an illustrative embodiment of a retrofitted gate valve in a closed position.

Referring now primarily to FIG. 8, a detailed perspective view with a portion shown in cross section of a retrofitted valve 100 is shown to provide additional detail. As discussed above, in some embodiments dynamic skirt assemblies 132 are disposed between the slab gate 136 and each retrofit slab 128. In FIG. 8, the retrofitted valve 100 is shown in the closed position. In the closed position, the solid area 152 of the slab gate 136 is blocking flow through the through-bore 112, and the open area 156 of the slab gate 136 is located adjacent to the dynamic skirt assemblies 132. In this position, fluid is trapped within the open area 156 of the slab gate 136. The dynamic skirt assemblies 132 function as a barrier to prevent fluid flow between the open area 156 of the slab gate 136 and into the cavities 125 behind and below the dynamic skirt assemblies 132 and the retrofit slabs 128. The cavities 125 behind and below the dynamic skirt assemblies 132 and the retrofit slabs 128 are typically lubrication areas that contain grease or other lubricants to facilitate the functioning of the retrofitted valve 100. It is undesirable for there to be fluid communication between the cavities 125 and the open area 156 of the gate slab 128. Allowing fluid communication between these areas results in loss of lubricants into the through-bore 112 and contamination of the lubricants with fluid flowing through the retrofitted valve 100.

The dynamic skirt plate assembly 132 functions to reduce such fluid communication. In the depicted embodiment, the dynamic skirt assembly 132 includes a skirt plate 196, a skirt ring 200, and a skirt energizer 212. The skirt energizer 212 is disposed on the first side 192 of the skirt plate 196. The skirt ring 200 is also disposed on the first side 192 of the skirt plate 196. In this embodiment, the skirt energizer 212 is located within the skirt ring 200. When installed within the retrofitted valve 100, the skirt energizer 212 contacts the adjacent retrofit slab 128 and provides a biasing force to bias the skirt plate 196 away from the retrofit slab 128 and toward the slab gate 136. In some embodiments that skirt energizer 212 is a spring. In some embodiments the skirt energizer 212 is a wave spring, coil spring, helical spring, disk spring, or leaf spring, or rubber/plastic compressible material that would output a force.

The qualities of the fluid communication seal between the slab gate 136 and each of the skirt plates 196 are dependent on the amount of contact between the slab gate 136 and each skirt plate 196. However, when the retrofitted valve 100 is in the closed position, the slab gate 136 is subject to lateral movement in the first direction 120 in response to fluid pressure exerted on the slab gate 136. This movement of the slab gate 136 may result in loss of contact between the slab gate 136 and the upstream skirt plate 196, and, therefore, loss of the fluid seal between the slab gate 136 and the upstream skirt plate 196. The skirt energizer 212 addresses this by providing a biasing force that pushes the skirt plate 196 toward the slab gate 136. This biasing force thereby maintains the fluid seal between the slab gate 136 and the skirt plate 196.

It should be understood that in some embodiments of the retrofit valve 100, a dynamic skirt assembly 132 is omitted. In these embodiments, the retrofit slabs 128 are used to convert the round gate cavity 116 so that at least a portion of the round gate cavity 116 is converted to a slab gate cavity 138 (FIG. 7) or rectangular slab gate cavity. The use of a dynamic skirt assembly 132 or any type of skirt at all is not necessary to form a retrofit valve 100, as described herein.

Figure 13:
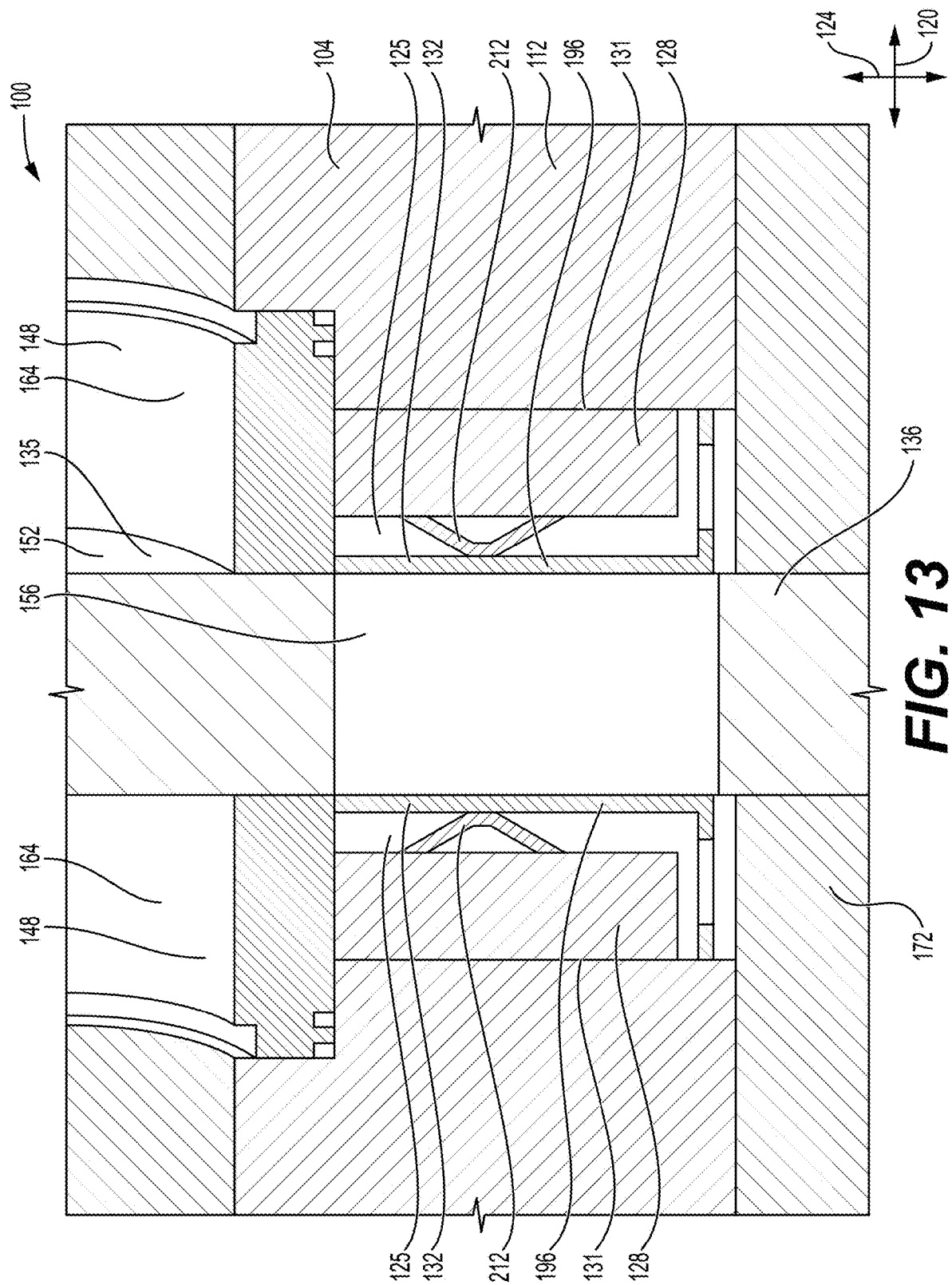
FIG. 13 is a schematic, perspective detailed view with a portion in cross section of a portion of an illustrative embodiment of a retrofitted gate valve in a closed position.
Figure 14:
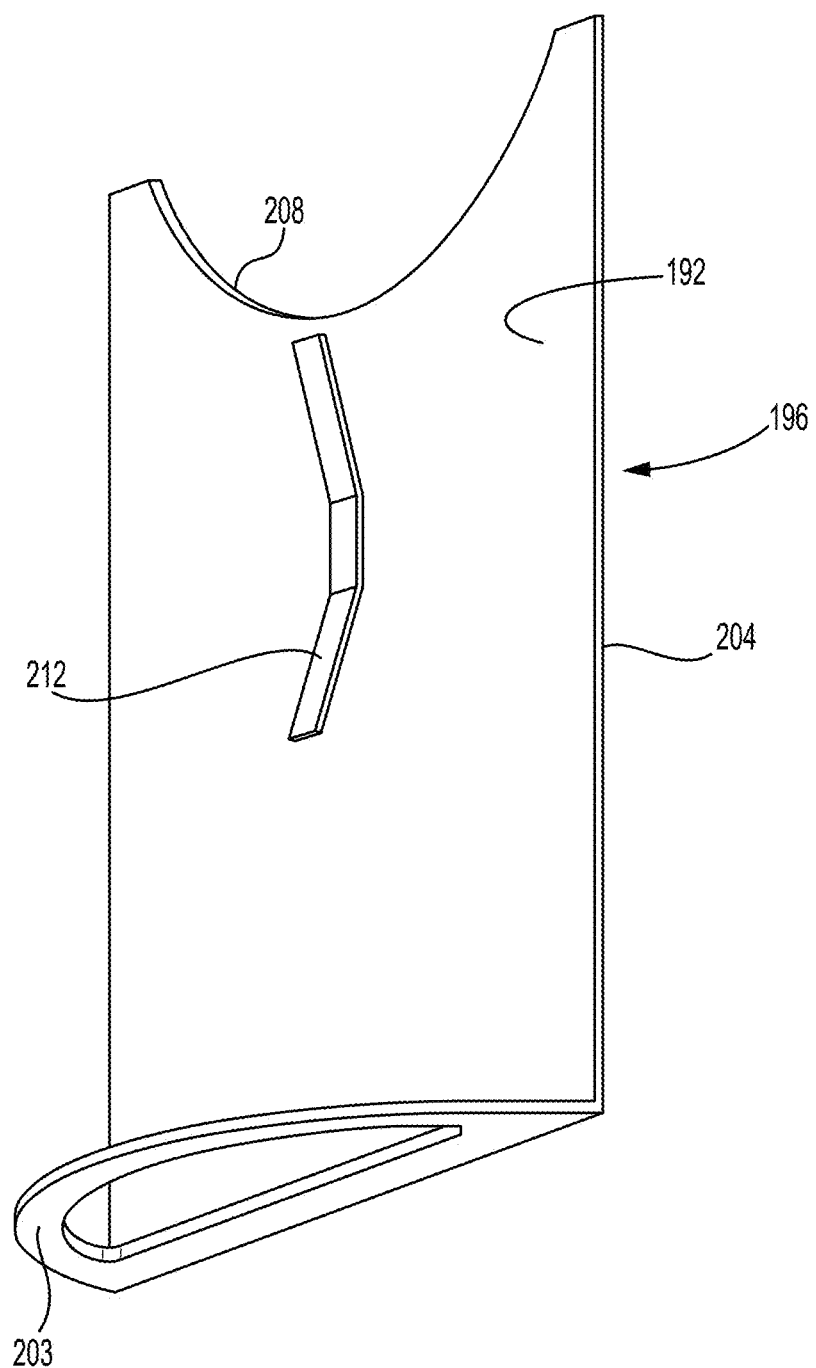
FIG. 14 is a schematic, perspective view of an illustrative embodiment of a skirt assembly for a retrofitted gate valve.

Referring now primarily to FIG. 13, another embodiment of the retrofit valve 100 utilizing the dynamic skirt assembly 132 will be discussed. The embodiment of the retrofit valve 100 of FIG. 13 is analogous to the embodiment of the retrofit valve 100 of FIG. 8 in many respects. The differences between these embodiments will be discussed. The dynamic skirt assembly 132 of the embodiment of FIG. 13 is different. In the embodiment of FIG. 13, the dynamic skirt assembly 132 includes the skirt plate 196, the skirt energizer 212 coupled to the first side 192 (FIG. 14) of the skirt plate 196, and a skirt retainer 203 (FIG. 14). The skirt ring 200, which is present in the embodiment of FIG. 8, is omitted in the embodiment of FIG. 13. In this embodiment, the skirt assembly is retained between the valve body 104 and the slab gate 136 with interference fits between the skirt energizer 212 and the valve body 104; between the skirt retainer 203 (FIG. 14) and the valve body 104; and/or between the skirt plate 196 and the slab gate 136. The retrofit slab 128 also is different in this embodiment, as compared to the embodiment of the retrofit valve 100 of FIG. 8. Since the skirt ring 200 is omitted from the skirt assembly 132, a skirt retainer cavity 184 (FIG. 9) is omitted from the retrofit slab 128 as shown in more detail in FIG. 10.

Figure 9:
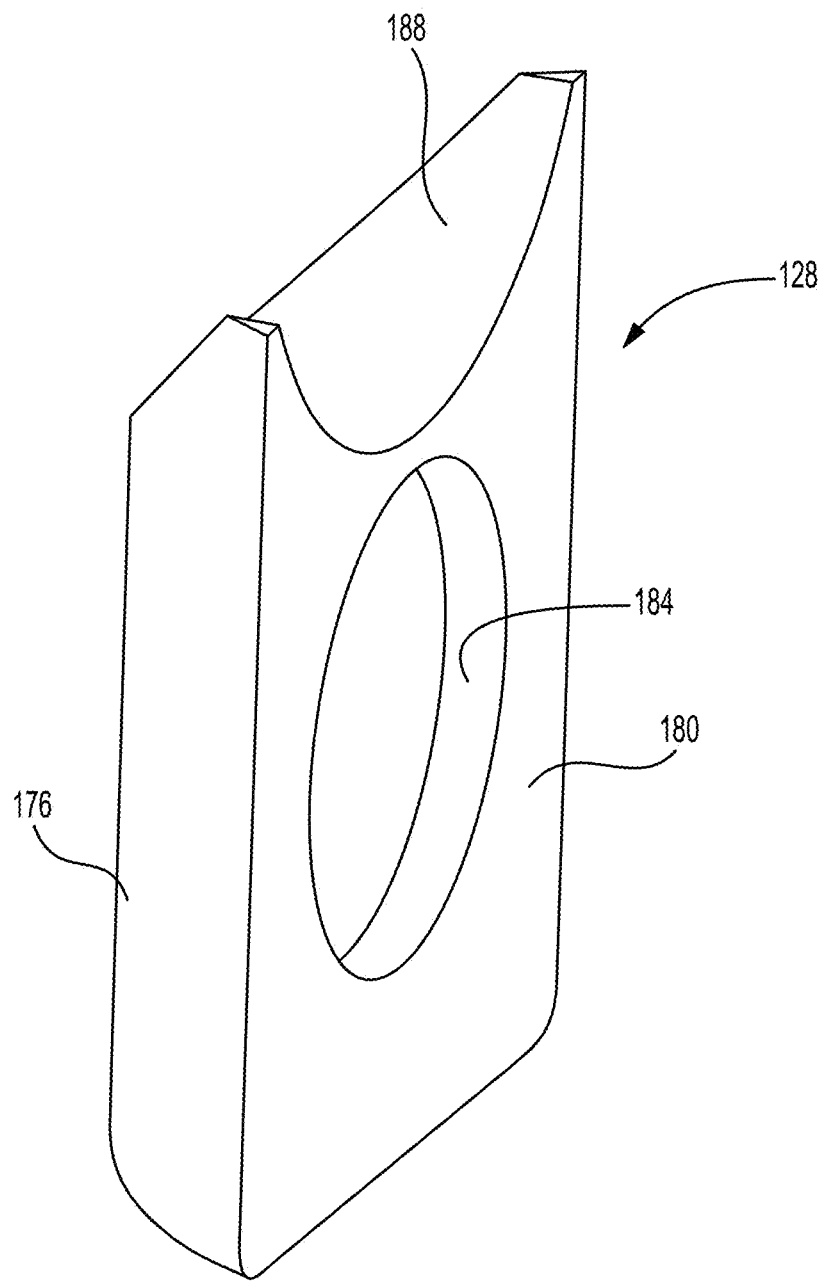
FIG. 9 is a schematic, perspective detailed view of an illustrative embodiment of a retrofit slab for a retrofitted gate valve.

Referring now primarily to FIG. 9, an illustrative embodiment of the retrofit slab 128 is presented. This embodiment of the retrofit valve 128 is used in the embodiment of the retrofitted valve 100 shown in FIG. 8. The first side 176 of the retrofit slab 128 is curved to conform with the rounded walls of the round gate cavity 116 (FIG. 7). The second side 180 of the retrofit slab 128 is planar to conform to a sealing side 135 (FIG. 4) of the slab gate 136. The skirt assembly cavity 184 is formed within a portion of the second side 180 of the retrofit slab 128. The skirt assembly cavity 184 is configured to receive at least a portion of the dynamic skirt assembly 132. The top edge 188 of the retrofit slab 128 is shaped to conform and to mate with a lower side of a seat assembly 164.

Figure 10:
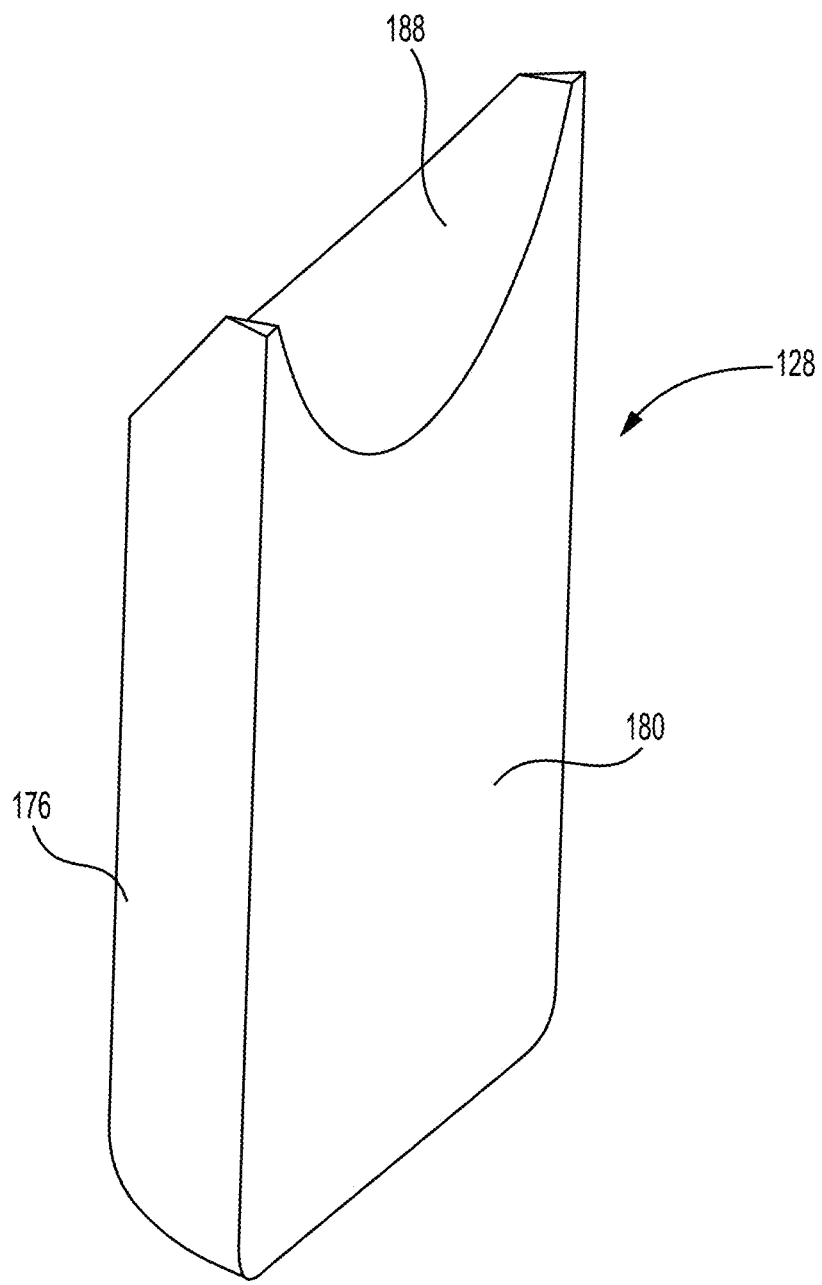
FIG. 10 is a schematic, perspective view of an illustrative embodiment of a retrofit slab for a retrofitted gate valve.

Referring now primarily to FIG. 10, another illustrative embodiment of the retrofit slab 128 is presented. This embodiment of the retrofit valve 128 is used in the embodiment of the retrofitted valve 100 shown in FIG. 13. This embodiment is analogous to the embodiment of FIG. 9 in most aspects. However, in this embodiment, the skirt assembly cavity 184 is omitted and the second side 180 of the retrofit slab 128 has a smooth planar surface without any cavities. When this embodiment of the retrofit slab 128 is used in a retrofit valve 100, the dynamic skirt assembly 132 may be mated to the second side 180 of the retrofit slab 128 or the dynamic skirt assembly 132 may be omitted.

Figure 11:
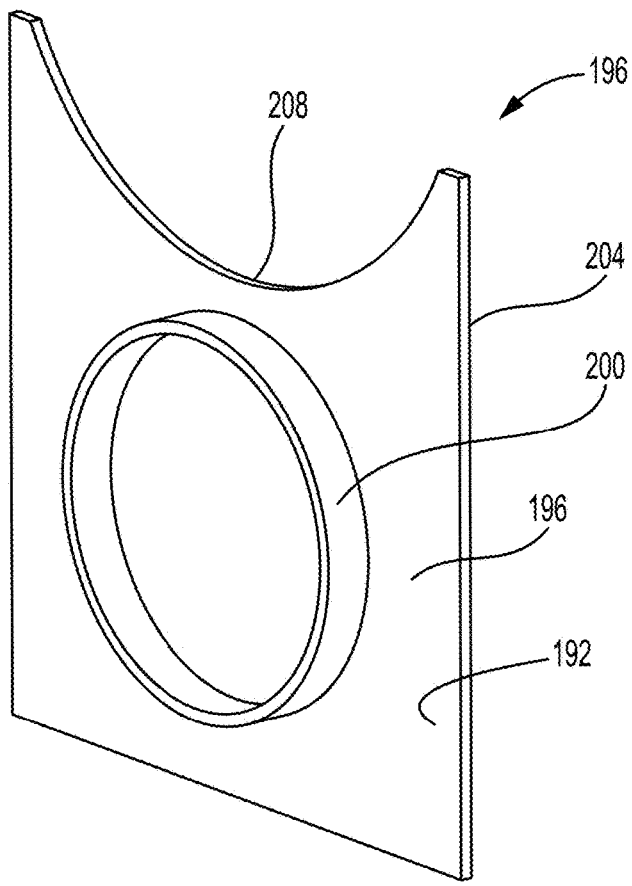
FIG. 11 is a schematic, perspective view of an illustrative embodiment of a skirt assembly for a retrofitted gate valve.
Figure 12:
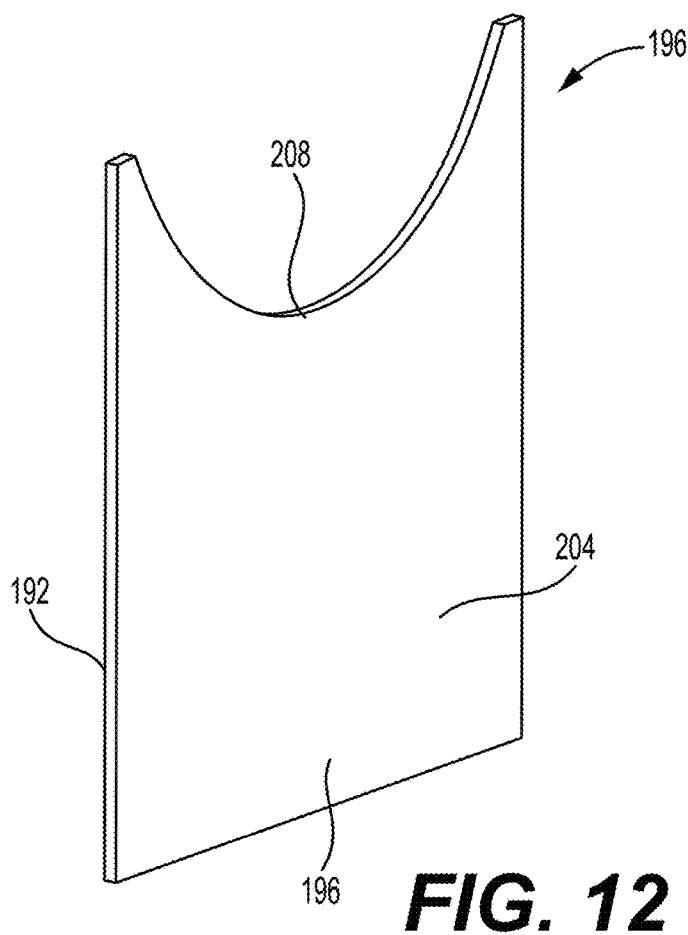
FIG. 12 is a schematic, perspective view of an illustrative embodiment of a skirt assembly for a retrofitted gate valve.

Referring now primarily to FIGS. 11 and 12, an illustrative embodiment of a skirt plate 196 of a dynamic skirt assembly 132 is depicted. The skirt plate 196 has a first side 192 of the skirt plate 196. A skirt ring 200 is located on the first side 192 of the skirt plate 196. The skirt ring 200 is configured to conform with the skirt assembly cavity 184 of the retrofit slab 128 (FIG. 9) so that the skirt ring 200 is captured by the retrofit slab 128, when the components are assembled within the retrofitted valve 100. The second side 204 of the skirt plate 196 has a planar surface that, when assembled within the retrofitted valve 100, mates or abuts with the sealing side of the slab gate 136. The top edge 208 of the skirt plate 196 is curved to conform and mate with a lower edge of the seat assembly 164.

Referring now to FIG. 14, a different embodiment of a skirt plate 196 for use in a dynamic skirt assembly 132 is shown. The embodiment of FIG. 14 is used in the embodiment of the retrofitted valve 100 shown in FIG. 13, as discussed above. In this embodiment, the skirt plate 196 is analogous to the skirt plate 196 of the embodiment of FIGS. 11 and 12 in many regards. The resulting skirt plate assembly 132 varies in that in the embodiment of FIG. 14, the skirt plate assembly 132 includes the skirt retainer 203, as discussed above in relation to the embodiment of the retrofitted valve 100 of FIG. 14. The skirt retainer 203 extends from the first side 192 of the skirt plate 196. The skirt energizer 212 is coupled to the first side 196 of the skirt plate 196.

Referring to FIGS. 1-12, in another illustrative embodiment, a method is presented of retrofitting a round gate cavity valve for use with a slab gate 136 with dynamic skirt assemblies 132. The method includes the steps of 1) removing a round gate cavity gate from a valve having a round gate cavity 116; 2) inserting retrofit slabs 128 into the round gate cavity 116 to form a slab gate cavity 138 that is substantially rectangular in shape or has flat sides with at least two planar surfaces; 3) installing a dynamic skirt assembly 132 adjacent to each of the retrofit slabs 128; and 4) installing a slab gate 136 into the slab gate cavity 138 formed by the retrofit slabs 128. The method may further include the step of inserting at least one seat 148 or seat assembly 164 proximate to the intersection of the round gate cavity 116 and a through-bore 112 of the valve 100. The order of the steps may vary. In some embodiments, the step of removing a round gate cavity gate from a valve having a round gate cavity 116 and the method begins with a round gate cavity valve without a gate present by inserting retrofit slabs 128 into the round gate cavity 116 to form a slab gate cavity 138 that is substantially rectangular in shape or has flat sides with at least two planar surfaces. In some embodiments, the skirt assembly 132 is not dynamic.

In some embodiments, the dynamic skirt assembly 132 is omitted. In some embodiments, the method includes installing a gate assembly into the round gate cavity 116. The gate assembly includes at least a slab gate 136 and one stem, which may be an upper stem or a lower stem, coupled to the slab gate 128. In other embodiments, the slab gate assembly includes a slab gate 136 and two stems, one of which is an upper stem and the other of which is a lower stem. In some embodiments the slab gate 136 is attached to the stem or stems with a tee and t-slot connection, which allows for lateral movement of the slab gate 136 relative to the stem or stems along the first direction 120 when installed within the retrofitted valve 100.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

There are many examples of the various embodiments described herein. A number of examples also follow.

Example 1. A dynamic slab gate valve comprising:
a valve body having a through-bore therethrough;
a round gate cavity orthogonal to the though-bore, wherein the round gate cavity has a circular shape;
at least two retrofit slabs located within the round gate cavity, wherein a first side of each retrofit slab is curved to conform to a curved wall of the round gate cavity and a second side of each retrofit slab is substantially planar;
wherein the retrofit slabs form a slab gate cavity having two parallel planar sides for receiving a slab gate;
a slab gate slidably disposed within the slab gate cavity; and
at least one dynamic seat assembly.

Example 2. The dynamic slab gate valve of Example 1, further comprising at least one stem attached to the slab gate.

Example 3. The dynamic slab gate valve of Example 2, wherein the at least one stem comprises and upper stem and a lower stem.

Example 4. The dynamic slab gate valve of Example 2 or 3, where the at least one stem is attached to the slab gate by a tee and t-slot connection to allow for lateral movement of the slab gate relative to the at least one stem.

Example 5. The dynamic slab gate valve of Example 1, further comprising a dynamic skirt assembly disposed between each retrofit slab and the slab gate.

Example 6. The dynamic slab gate valve of Example 5, wherein each dynamic skirt assembly comprises a skirt plate, a skirt assembly retainer, and a skirt energizer, wherein each skirt assembly retainer is captured by a skirt retainer cavity of each retrofit slab and wherein the skirt energizer provides a biasing force to urge the skirt plate toward the slab gate.

Example 7. The dynamic slab gate valve of Example 6, wherein the skirt energizer is a spring.

Example 8. The dynamic slab gate valve of Example 7, wherein the spring is a wave spring, coil spring, helical spring, disk spring, or leaf spring.

Example 9. The dynamic slab gate valve of Example 1, where the at least one dynamic seat assembly comprises two dynamic seat assemblies disposed at least partially within the round gate cavity and at least partially within the through-bore, where each seat assembly has a planar surface facing toward the slab gate that abuts with a side of the slab gate.

Example 10. A method of retrofitting a round gate valve, comprising the steps of:
removing a round gate cavity gate from a round gate cavity of a round gate valve;
installing two retrofit slabs within the round gate cavity to form a slab gate cavity within at least a portion of the round gate cavity, wherein the slab gate cavity is formed by a planar side of each of the retrofit slabs;
installing two dynamic seats that are partially disposed within the round gate cavity and partially disposed within a through-bore of the round gate valve; and
installing a slab gate within the slab gate cavity.

Example 11. The method of Example 10, further comprising the step of installing a dynamic skirt assembly between each retrofit slab and the slab gate.

Example 12. The method of Example 11, wherein each dynamic skirt assembly comprises a skirt plate, a skirt assembly retainer, and a skirt energizer, wherein the skirt assembly retainer and the skirt energizer are attached to the skirt plate, wherein each skirt assembly retainer is captured by a skirt retainer cavity of each retrofit slab and wherein the skirt energizer provides a biasing force to urge the skirt plate toward the slab gate.

Example 13. The method of Example 12, wherein the skirt energizer is a spring.

Example 14. The method of Example 13, wherein the spring is a wave spring, coil spring, helical spring, disk spring, or leaf spring.

Example 15. The method of Example 11, further comprising the step of attaching at least one stem to the slab gate.

Example 16. The method of Example 15, wherein the at least one stem comprises an upper stem and a lower stem.

Example 17. The method of Example 16, wherein the upper stem and the lower stem are each connected to the slab gate by a tee and t-slot connection that allows for lateral movement of the slab gate relative to the upper stem and the lower stem.

Example 18. A dynamic slab gate valve comprising:
a valve body having a through-bore therethrough;
a round gate cavity orthogonal to and bisecting the though-bore, wherein the gate cavity has a circular cross section area;
at least two retrofit slabs located within the round gate cavity, wherein a first side of each retrofit slab is curved to conform to a curved wall of the round gate cavity and a second side of each retrofit slab is substantially planar;
wherein the retrofit slabs form a slab gate cavity having two parallel planar sides for receiving a slab gate;
at least two seats installed proximate an intersection of the round gate cavity and the through-bore;
a slab gate slidably disposed within the slab gate cavity;
at least one stem connected to the slab gate; and
a dynamic skirt assembly disposed between each retrofit slab and the slab gate.

Example 19. The dynamic slab gate valve of Example 18, wherein each dynamic skirt assembly comprises a skirt plate, a skirt assembly retainer, and a skirt energizer, wherein each skirt assembly retainer is captured by a skirt retainer cavity of each retrofit slab and wherein the skirt energizer provides a biasing force to urge the skirt plate toward the slab gate.

Example 20. The dynamic slab gate valve of Example 19, wherein the skirt energizer is a spring.

Example 21. The dynamic slab gate valve of Example 20, wherein the spring is a wave spring, coil spring, helical spring, disk spring, or leaf spring.

What is claimed:

1. A dynamic slab gate valve comprising:
a valve body having a through-bore formed therethrough;
a round gate cavity formed within the valve body and substantially orthogonal to the though-bore;
at least two retrofit slabs located within the round gate cavity, wherein a first side of each retrofit slab is curved to conform to a curved wall of the round gate cavity and a second side of each retrofit slab is substantially planar;
wherein the retrofit slabs form a slab gate cavity having two parallel planar sides for receiving a slab gate; and
a slab gate slidably disposed within the slab gate cavity, wherein the slab gate, when in a first position, allows for fluid flow through the through-bore and, when in a second position, substantially blocks fluid flow through the through-bore and;
a dynamic skirt assembly disposed between each retrofit slab and the slab gate.

2. The dynamic slab gate valve of claim 1, further comprising at least one dynamic seat assembly at least partially disposed within the through-bore and in contact with the slab gate.

3. The dynamic slab gate valve of claim 2, further comprising at least one stem coupled to the slab gate.

4. The dynamic slab gate valve of claim 3, where the at least one stem is coupled to the slab gate by a tee and t-slot connection to allow for lateral movement of the slab gate relative to the at least one stem.

5. The dynamic slab gate valve of claim 1, wherein each dynamic skirt assembly comprises a skirt plate, a skirt assembly retainer, and a skirt energizer, wherein the skirt assembly retainer and the skirt energizer are coupled to the skirt plate, wherein each skirt assembly retainer is captured by a skirt retainer cavity of each retrofit slab, and wherein the skirt energizer provides a biasing force to urge the skirt plate toward the slab gate.

6. The dynamic slab gate valve of claim 5, wherein the skirt energizer is a spring.

7. The dynamic slab gate valve of claim 2, wherein the at least one dynamic seat assembly comprises two dynamic seat assemblies disposed at least partially within the round gate cavity and at least partially within the through-bore, wherein each seat assembly has a planar surface facing toward the slab gate that abuts with a side of the slab gate.

8. A dynamic slab gate valve comprising:
a valve body having a through-bore therethrough;
a round gate cavity formed within the valve body and orthogonal to and intersecting the though-bore, wherein the round gate cavity has a circular cross section area;
at least two retrofit slabs located within the round gate cavity, wherein a first side of each retrofit slab is curved to conform to a curved wall of the round gate cavity and a second side of each retrofit slab is substantially planar;
wherein the retrofit slabs form a slab gate cavity having two parallel planar sides for receiving a slab gate;
at least two seats installed proximate to an intersection of the round gate cavity and the through-bore;
a slab gate slidably disposed within the slab gate cavity;
at least one stem connected to the slab gate; and
a dynamic skirt assembly disposed between each retrofit slab and the slab gate.

9. The dynamic slab gate valve of claim 8, wherein each dynamic skirt assembly comprises a skirt plate, a skirt assembly retainer, and a skirt energizer, wherein the skirt assembly retainer and the skirt energizer are coupled to the skirt plate, wherein each skirt assembly retainer is captured by a skirt retainer cavity of each retrofit slab, and wherein the skirt energizer provides a biasing force to urge the skirt plate toward the slab gate.

10. The dynamic slab gate valve of claim 9, wherein the skirt energizer is a spring.

11. The dynamic slab gate valve of claim 10, wherein the spring is a wave spring, coil spring, helical spring, disk spring, rubber spring, or leaf spring.

12. The dynamic slab gate valve of claim 8 where the at least one stem is coupled to the slab gate using a tee and t-slot connection.

* * * * *